(12) United States Patent
Zhang et al.

(10) Patent No.: US 10,067,534 B2
(45) Date of Patent: Sep. 4, 2018

(54) ASSEMBLY FOR PREVENTING UNEXPECTED SHUTDOWN AND ELECTRONIC DEVICE WITH THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jun-Liang Zhang, Shenzhen (CN); Tai-Shan Zhu, Shenzhen (CN); Tao Jiang, Shenzhen (CN); Hai-Qian Ge, Shenzhen (CN); Zhou Chen, Shenzhen (CN); Juan Wang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/587,367

(22) Filed: May 4, 2017

(65) Prior Publication Data

US 2017/0329367 A1 Nov. 16, 2017

(30) Foreign Application Priority Data

May 10, 2016 (CN) .......................... 2016 1 0305369

(51) Int. Cl.
*G06F 1/16* (2006.01)
*H01H 13/14* (2006.01)

(52) U.S. Cl.
CPC ............ *G06F 1/1633* (2013.01); *H01H 13/14* (2013.01); *H01H 2239/03* (2013.01)

(58) Field of Classification Search
CPC ..... G06F 1/1633; G06F 1/16; H01H 2239/03; H01H 13/14; H01H 9/20; H03M 11/00
USPC .............. 361/679.5, 679.08, 679.09; 341/24; 200/43.02
See application file for complete search history.

(56) References Cited

U.S. PATENT DOCUMENTS

| | | | | |
|---|---|---|---|---|
| 3,906,814 A | * | 9/1975 | Magnussen | G05G 5/005 200/327 |
| 2010/0134329 A1 | * | 6/2010 | Wang | G06F 3/0202 341/24 |

* cited by examiner

*Primary Examiner* — Mandeep S Buttar
(74) *Attorney, Agent, or Firm* — ScienBiziP, P.C.

(57) ABSTRACT

An assembly for preventing accidental shutdowns includes a trigger, a first button, a resisting portion, a first driving portion, a second driving portion, a sliding block, and a processing unit. The sliding block includes at least one block and at least one groove. When the electronic device is in a shutdown state, the at least one resisting wall is in the at least one groove. When the electronic device is powered on, the processing unit controls the first driving portion to drive the resisting portion to rise up, and controls the second driving portion to drive the sliding block to move horizontally related to the first button until one end of the resisting wall resists against the first button. The other end of the resisting wall resists against the at least one block. An electronic device with the assembly is also provided.

14 Claims, 4 Drawing Sheets

ASSEMBLY FOR PREVENTING UNEXPECTED SHUTDOWN AND ELECTRONIC DEVICE WITH THE SAME

CROSS-REFERENCE TO RELATED APPLICATIONS

This application claims priority to Chinese Patent Application No. 201610305369.2 filed on May 10, 2016.

FIELD

The subject matter herein generally relates to preventing electronic devices from unexpected shutdowns.

BACKGROUND

When using an electronic device, users may accidentally touch the shut-down button, and the electronic device will shut down unexpectedly.

BRIEF DESCRIPTION OF THE DRAWINGS

Implementations of the present technology will now be described, by way of example only, with reference to the attached figures.

DETAILED DESCRIPTION

Figure 1:
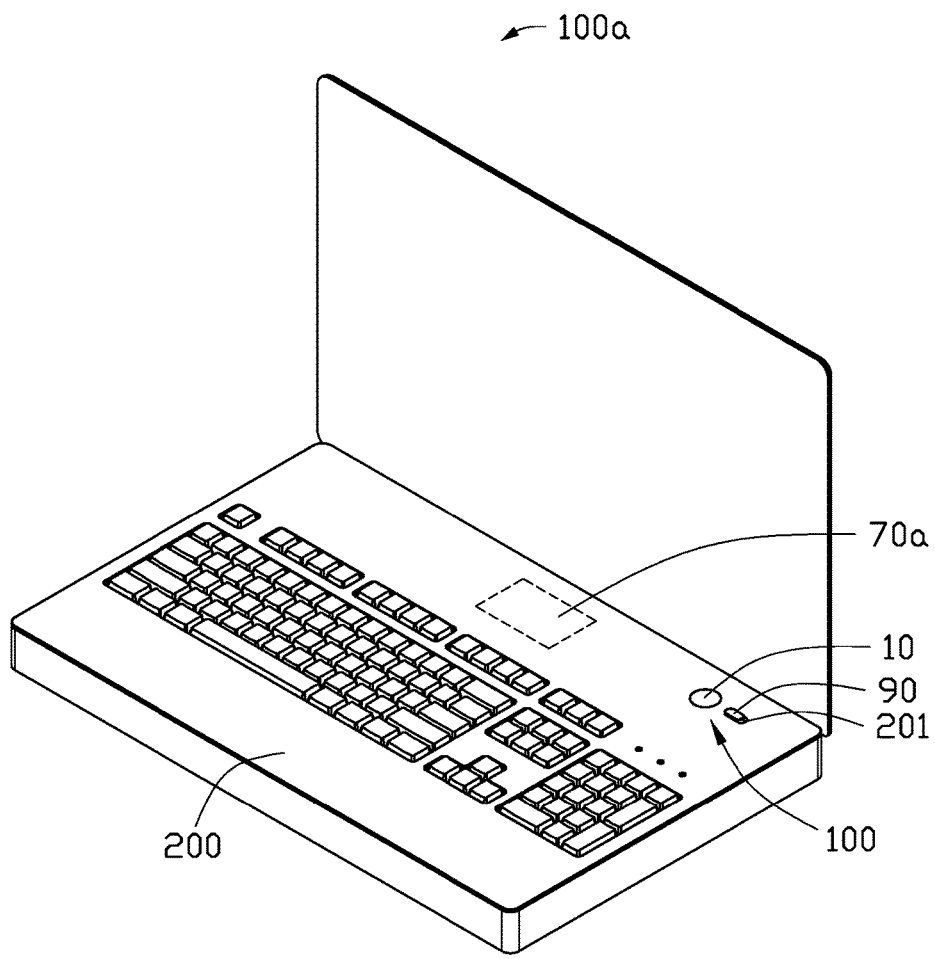
FIG. 1 is a schematic view illustrating an exemplary embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

FIG. 1 illustrates an exemplary embodiment of an electronic device 100a. In the exemplary embodiment, the electronic device 100a can include, but is not limited to, an assembly 100, a shell 200, and a bottom surface 300 (see FIG. 2). The assembly 100 prevents the electronic device 100a from shutting down unexpectedly. The assembly 100 is received in the shell 200 and a part of the assembly 100 protrudes from the shell 200. In the exemplary embodiment, the electronic device 100a can be, but is not limited to, a notebook computer, a desktop computer, a mobile phone, or other electronic devices having a shut-down button.

Figure 2:
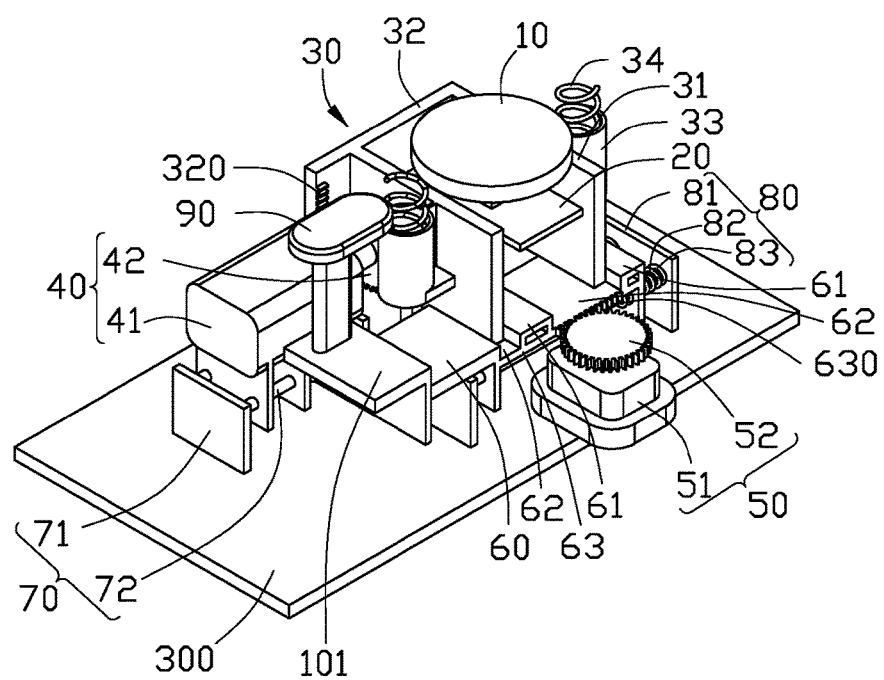
FIG. 2 is a schematic view illustrating an exemplary embodiment of an assembly in a first state applied in the electronic device of FIG. 1.
Figure 3:
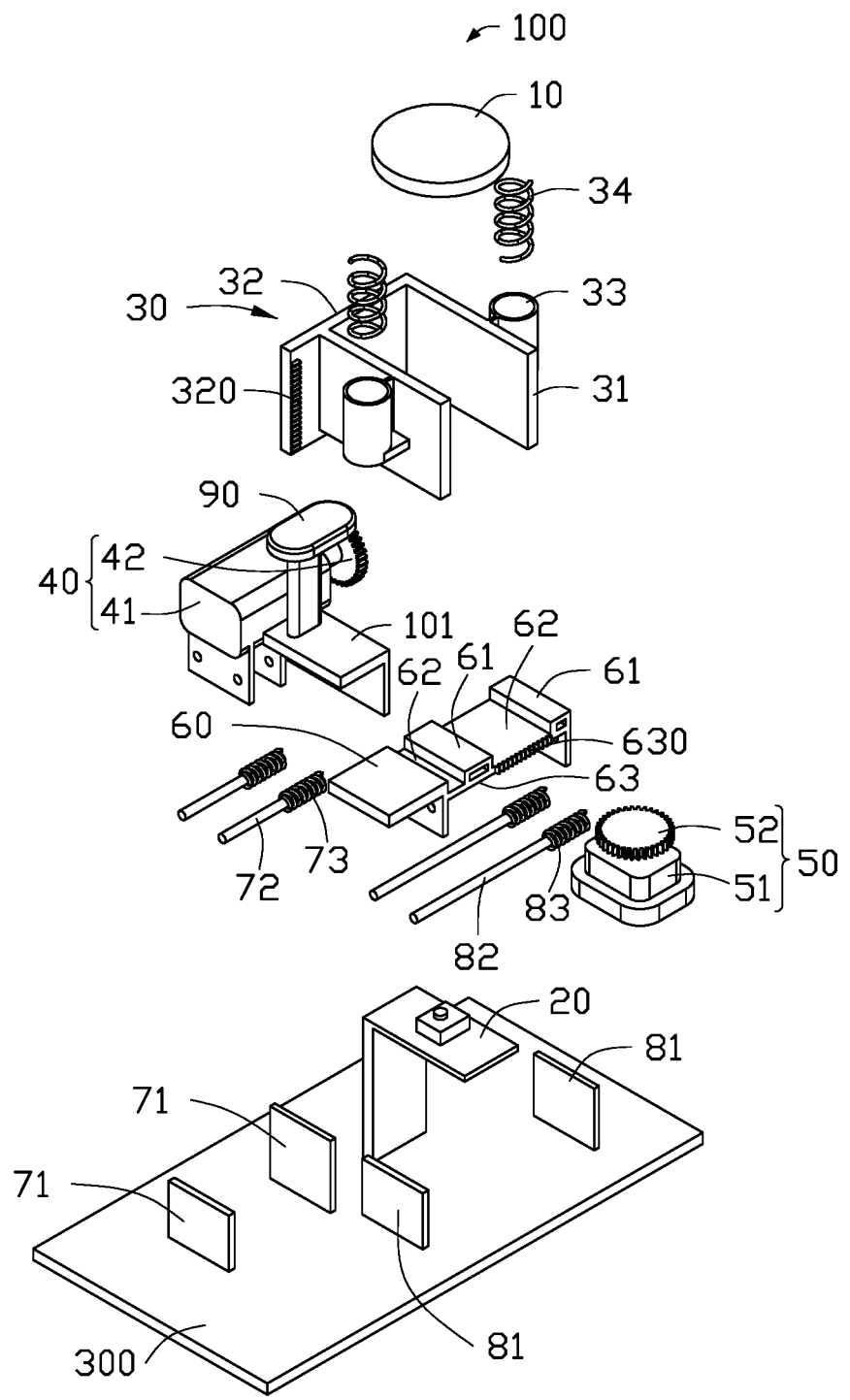
FIG. 3 is an exploded view of the assembly of FIG. 2.

Referring to FIG. 2 and FIG. 3, in the exemplary embodiment, the assembly 100 can include a first button 10, a trigger 20, a resisting portion 30, a first driving portion 40, a second driving portion 50, a sliding block 60, and a processing unit 70a.

The first button 10 is a shut-down button of the electronic device 100a. The first button 10 protrudes from the shell 200 for users to operate. When the electronic device 100a is in a power-off state, if the first button 10 is pressed to contact the trigger 20, the electronic device 100a will be powered on. When the electronic device 100a is in a power-on state, if the first button 10 is pressed to contact the trigger 20, the electronic device 100a will be powered off.

The first driving portion 40 is connected to the resisting portion 30 and the second driving portion 50 is connected to the sliding block 60. The processing unit 70aa is electrically connected to the first driving portion 40 and the second driving portion 50. In the exemplary embodiment, the processing unit 70a can be a Central Processing Unit of the electronic device 100a.

In the exemplary embodiment, the resisting portion 30 includes two resisting walls 31 and a connecting wall 32 as shown in FIG. 3. The two resisting walls 31 are parallel with each other, opposite ends of the connecting wall 32 are respectively connected to an end of each resisting wall 31. The trigger 20 is mounted between the two resisting walls 31. The first button 10 is above the two resisting walls 31. The sliding block 60 can include two blocks 61 and two grooves 62. The two blocks 61 and the two grooves 62 are alternately arranged. When the electronic device 100a is in a shut down state, a lower end of each of the two resisting walls 31 is received in one of the two grooves 62, and the first button 10 is spaced from an upper end of the two resisting walls 31.

Referring to FIG. 3, when pressing the first button 10 to contact the trigger 20 to power on the electronic device 100a, the processing unit 70a controls the first driving portion 40 to drive the resisting portion 30 to rise up. At the same time, the processing unit 70a controls the second driving portion 50 to drive the sliding block 60 to move horizontally until the upper ends of the two resisting walls 31 resist the first button 10 and the lower ends of the two resisting walls 31 resist the two blocks 61. Thus, even when the first button 10 is pressed, the first button 10 cannot contact the trigger 20 and the electronic device 100 cannot be shut down.

When the electronic device 100 is powered off by a user, the processing unit 70a controls the second driving portion 50 to drive the sliding block 60 to move horizontally until the lower ends of the two resisting walls 31 align with the two grooves 62, then the processing unit 70a controls the first driving portion 40 to drive the resisting portion 30 to move down until the two resisting walls 31 are received in the two grooves 60. Thus, the resisting walls 31 are spaced from the first button 10.

Figure 4:
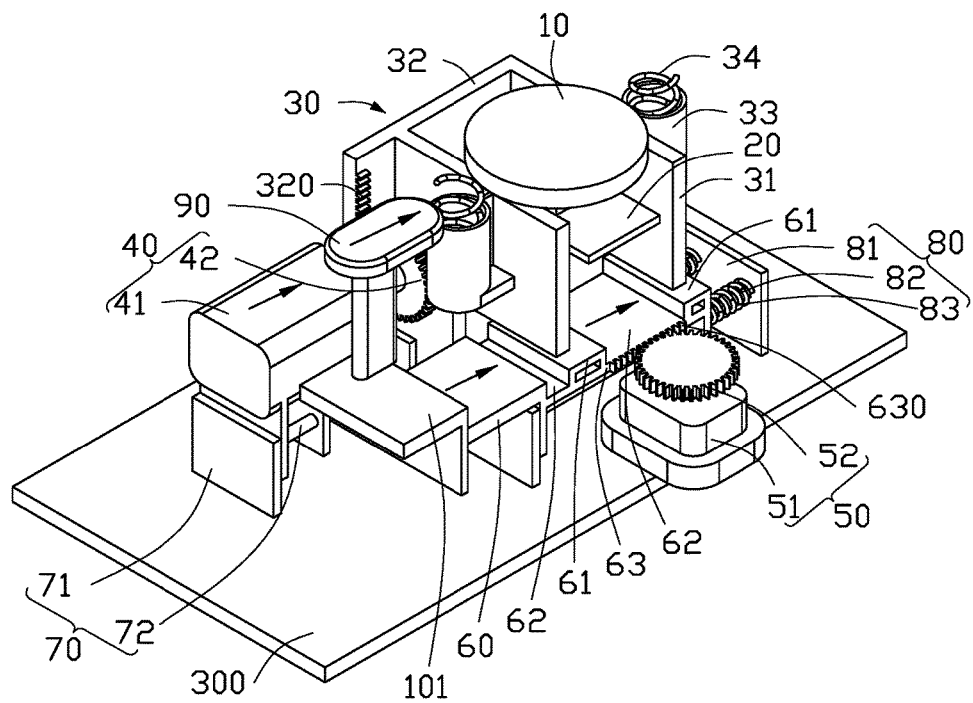
FIG. 4 is a schematic view illustrating an exemplary embodiment of the assembly of FIG. 2 in a second state.

Referring to FIG. 4, the resisting portion 30 further can include a first rack 320.

In the exemplary embodiment, the first driving portion 40 can include a first motor 41 and a first gear 42. The first gear 42 is engaged with the first rack 320. In the exemplary embodiment, the processing unit 70a controls the first motor 41 to drive the first gear 42 to rotate clockwise or anticlockwise. When the first gear 42 is driven to rotate clockwise, the first gear 42 drives the first rack 320 to rise up, and the resisting portion 30 rises up along with the first rack 320.

When the first gear 42 is driven to rotate anticlockwise, the first gear 42 drives the first rack 320 to move down, and the resisting portion 30 moves down along with the first rack 320.

In the exemplary embodiment, the second driving portion 50 can include a second motor 51 and a second gear 52. The sliding block 60 further includes a sidewall 63. A second rack 630 is defined on the sidewall 63. The second gear 52 is engaged with the second rack 630. In the exemplary embodiment, the processing unit 70a controls the second motor 51 to drive the second gear 52 to rotate clockwise or anticlockwise. When the second gear 52 is driven to rotate anticlockwise, the second gear 52 drives the second rack 630 to move to the left, and the sliding block 60 moves left along with the second rack 630. When the second gear 52 is driven to rotate clockwise, the second gear 52 drives the second rack 630 to move to the right, and the sliding block 60 moves right along with the rack 630.

In the exemplary embodiment, the assembly 100 further can include a first fixing portion 70 and a second fixing portion 80. The first fixing portion 70 can include two first fixing boards 71 and at least one sliding rod 72. The two first fixing boards 71 are parallel and mounted on the bottom surface 300. Ends of the first sliding rod 72 are connected to the two first fixing boards 71. At least one first spring 73 is coiled around the at least one first sliding rod 72. The first driving portion 40 is movably connected to the at least one first sliding rod 72 and resists against the at least one first spring 73. In the exemplary embodiment, the number of the first sliding rods 72 is two, and the number of the first springs 72 is two.

The second fixing portion 80 can include two second fixing boards 81 and two second sliding rods 82. Two second springs 83 are respectively coiled around the two second sliding rods 82. The two second fixing boards 81 are parallel and mounted on the bottom surface 300. Ends of each second sliding rod 82 are connected to the two second fixing boards 81. The sliding block 60 is movably connected to the two second sliding rods 82 and resists against the second spring 83. The sliding block 60 can be driven by the second driving portion 50 to move along the second sliding rods 82.

In the exemplary embodiment, the assembly 100 further can include a second button 90 and a pushing member 101. The second button 90 is mounted to the pushing member 101. The pushing member 101 is mounted to the first driving portion 40, and is movably connected to the at least one first sliding rod 72. The pushing member 101 faces the sliding block 60.

In the exemplary embodiment, the resisting portion 30 further includes two receiving portions 33 and two third springs 34. The two receiving portions 33 are mounted on the resisting walls 31. In the exemplary embodiment, each receiving portion 33 is a hollow cylinder, the two third springs 34 are received in the two receiving portions 33, and one end of each third spring 34 extends out of the receiving portion 33 to resist against an inner surface of the shell 200. In an initial state, the third springs 34 are compressed.

Referring to FIG. 1, in the exemplary embodiment, the shell 200 further defines a through hole 201. The second button 90 passes through the through hole 201 and can move lengthways through the through hole 201.

Referring to FIG. 3, in the exemplary embodiment, when the electronic device 100a has crashed and other shutdown procedure is not available, a user can shift the second button 90 to allow the second button 90 to slide along the through hole 201 in a direction away from the resisting portion 30. Thus, the second button 90 drives the first driving portion 40 and the pushing portion 101 to move away from the resisting portion 30, and the first gear 42 is moved away from the first rack 320. The pushing member 101 further pushes the sliding block 60 to move to a position where the lower end of the resisting walls 31 faces the groove 62. An elastic restoring force of the third springs 34 drives the two resisting walls 31 into the grooves 62, thus, the two resisting walls 31 are spaced away from the first button 10, and the first button 10 can be pressed down to contact the trigger 20 and shut down the electronic device 100a.

When the first driving portion 40 moves away from the resisting portion 30, the first spring 73 is compressed. When the second button 90 is released by the user, the elastic restoring force of the first spring 73 drives the first driving portion 40 to move toward the resisting portion 30 until the first gear 42 engages with the first rack 320.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An assembly for preventing an electronic device from unexpected shutting down comprising:
   a trigger;
   a first button to be pressed to contact with the trigger and to power on the electronic device or power off the electronic device;
   a resisting portion comprising at least one resisting wall;
   a first driving portion connected to the resisting portion;
   a second driving portion;
   a sliding block connected to the second driving portion, the sliding block comprising at least one block and at least one groove, when the electronic device is in a power-off state, the at least one resisting wall is inserted into the at least one groove; and
   a processing unit coupled with the first driving portion and the second driving portion;
   wherein when the electronic device is powered on, the processing unit controls the first driving portion to drive the resisting portion to rise up related to the first button, the processing unit further controls the second driving portion to drive the sliding block horizontally related to the first button until one end of the resisting wall resists against the first button, and another end of the resisting wall resists against the at least one block.

2. The assembly of claim 1, wherein the resisting portion further comprises at least one connecting wall, one end of the connecting wall defines a first rack; the first driving portion comprises a first motor and a first gear, the first gear is engaged with the first rack.

3. The assembly of claim 1, wherein the sliding block further comprises a sidewall, a second rack is defined on the sidewall; the second driving portion comprises a second motor and a second gear, the second gear is engaged with the second rack.

4. The assembly of claim 1, further comprising a first fixing portion, wherein the first fixing portion comprises two fixing boards and at least one first sliding rod; two ends of the first sliding rod are respectively connected to the two fixing boards; at least one first spring is coiled around the at least one first sliding rod; the first driving portion is movably connected to the at least one first sliding rod and resists against the at least one first spring.

5. The assembly of claim 1, further comprising a second fixing portion, wherein the second fixing portion comprises two second fixing boards and at least one second sliding rod, two ends of the second sliding rod are respectively connected to the two second fixing boards, at least one second spring is coiled around the at least one second sliding rod; the sliding block is movably connected to the at least one second sliding rod and resists against the at least one second spring.

6. The assembly of claim 1, further comprising a second button and a pushing member, the second button is mounted on the pushing member, the pushing member is mounted on the first driving portion, the pushing member faces the sliding block.

7. The assembly of claim 1, wherein the resisting portion further comprises at least one receiving portion and at least one third spring, the at least one receiving portion is mounted on the resisting wall, the at least one third spring is received in the at least one receiving portion, a part of the at least one third spring extends out of the receiving portion to resist against a shell of the electronic device.

8. An electronic device comprising:
a shell; and
an assembly received in the shell, the assembly comprising:
  a trigger;
  a first button to be pressed to contact with the trigger to power on the electronic device or power off the electronic device;
  a resisting portion comprising at least one resisting wall;
  a first driving portion connected to the resisting portion;
  a second driving portion;
  a sliding block connected to the second driving portion, the sliding block comprising at least one block and at least one groove, when the electronic device is in a shutdown state, the at least one resisting wall is inserted into the at least one groove; and
  a processing unit coupled with the first driving portion and the second driving portion;
  wherein when the electronic device is powered on, the processing unit controls the first driving portion to drive the resisting portion to rise up related to the first button, the processing unit further controls the second driving portion to drive the sliding block to move horizontally related to the first button until one end of the resisting wall resists against the first button, and another end of the resisting wall resists against the at least one block.

9. The electronic device of claim 8, wherein the resisting portion further comprises at least one connecting wall, one end of the connecting wall defines a first rack; the first driving portion comprises a first motor and a first gear, the first gear is engaged with the first rack.

10. The electronic device of claim 8, wherein the sliding block further comprises a sidewall, a second rack is defined on the sidewall; the second driving portion comprises a second motor and a second gear, the second gear is engaged with the second rack.

11. The electronic device of claim 8, wherein the assembly further comprises a first fixing portion, the first fixing portion comprises two fixing boards and at least one first sliding rod; two ends of the first sliding rod are respectively connected to the two fixing boards; at least one first spring is coiled around the at least one first sliding rod; the first driving portion is movably connected to the at least one first sliding rod and resists against the at least one first spring.

12. The electronic device of claim 8, wherein the assembly further comprises a second fixing portion, the second fixing portion comprises two second fixing boards and at least one second sliding rod, two ends of the second sliding rod are respectively connected to the two second fixing boards, at least one second spring is coiled around the at least one second sliding rod; the sliding block is movably connected to the at least one second sliding rod and resists against the at least one second spring.

13. The electronic device of claim 8, wherein the assembly further comprises a second button and a pushing member, the second button is mounted on the pushing member, the pushing member is mounted on the first driving portion, the pushing member faces the sliding block.

14. The electronic device of claim 8, wherein the resisting portion further comprises at least one receiving portion and at least one third spring, the at least one receiving portion is mounted on the resisting wall, the at least one third spring is received in the at least one receiving portion, a part of the at least one third spring extends out of the receiving portion to resist against a shell of the electronic device.

* * * * *